United States Patent

Angelo et al.

[11] Patent Number: 5,850,559
[45] Date of Patent: Dec. 15, 1998

[54] METHOD AND APPARATUS FOR SECURE EXECUTION OF SOFTWARE PRIOR TO A COMPUTER SYSTEM BEING POWERED DOWN OR ENTERING A LOW ENERGY CONSUMPTION MODE

[75] Inventors: Michael F. Angelo, Houston; Craig A. Miller, Cedar Park, both of Tex.

[73] Assignee: Compaq Computer Corporation, Houston, Tex.

[21] Appl. No.: 693,458

[22] Filed: Aug. 7, 1996

[51] Int. Cl.⁶ .............................. G06F 11/00; G06F 1/00
[52] U.S. Cl. .................................. 395/750.03; 395/183.14
[58] Field of Search ..................... 395/750.01–750.06, 395/183.14

[56] References Cited

U.S. PATENT DOCUMENTS 5,421,006   5/1995   Jablon et al. .......................... 395/575
5,537,540   7/1996   Miller et al. ...................... 395/183.14

OTHER PUBLICATIONS

Microsoft Visual C++, Reference vol. 1, Class Library Reference, Version 1.0. 1993, p. 997.
Intel486™ SL Microprocessor SuperSet System Design Guide, Nov. 1992, pp. 12–14 through 12–37.
Intel486™ SL Microprocessor SuperSet Programmer's Reference Manuel, Nov. 1992, pp. 6–28 through 6–53.

Primary Examiner—Meng-Ai T. An
Assistant Examiner—Jigar Pancholi
Attorney, Agent, or Firm—Pravel, Hewitt & Kimball

[57] ABSTRACT

A computer system that automatically and securely executes registered programs immediately prior to a transition to a reduced energy consumption state. A registrar table specifying registered programs and a secure modification detection value for each registered program are maintained in system management mode memory or other secure memory space in the computer system. A system management interrupt is generated following a request to remove power from the computer system or the occurrence of an event that triggers an energy saving mode. The system management interrupt handler routine then generates a current modification detection value for each registered program. The current modification detection values are compared with the secure modification detection values. Execution of a registered program is permitted if the values match. After all registered programs have been executed, the computer system automatically powers down or enters an energy saving mode. The computer system thereby allows secure and convenient execution of programs or commands that would typically interfere with normal computer use.

23 Claims, 7 Drawing Sheets

METHOD AND APPARATUS FOR SECURE EXECUTION OF SOFTWARE PRIOR TO A COMPUTER SYSTEM BEING POWERED DOWN OR ENTERING A LOW ENERGY CONSUMPTION MODE

SPECIFICATION +ps CROSS-REFERENCE TO RELATED APPLICATIONS

The present invention relates to computer system security as does commonly-owned U.S. patent application Ser. No. 08/678,722, entitled "SECURE SOFTWARE REGISTRATION AND INTEGRITY ASSESSMENT IN A COMPUTER SYSTEM."

BACKGROUND OF THE INVENTION

1. Field of the Invention

The present invention relates to a method for securely executing registered software applications in a computer system that is either being powered down or entering an energy saving mode.

2. Description of the Related Art

Computers are becoming increasingly important in many aspects of modern life, both in homes and in businesses. Huge amounts of money are invested by companies and individuals to purchase executable software. Even more money and time is spent developing the information contained in data files such as text documents and spreadsheets. Protecting these resources is therefore an important concern. Security-conscious users are requesting that security and integrity features be incorporated into their personal computers to protect access to critical files and to guarantee the trustworthiness of installed programs. Ideally, these security features should interfere with normal computer operation as little as possible.

Two main causes of software untrustworthiness are file corruption and viruses. File corruption usually follows a system failure occurring during a file transfer (i.e. the system is turned off while a file is being copied onto the hard disk, etc.) or similar occurrence. Controlling the power-down of the computer system is therefore important, particularly in computers with advanced operating systems such as Windows 95™ and Windows NT™, available from Microsoft Corp. These operating systems require the user to shut down via specific software steps rather than by simply turning off the power switch. For example, in Windows 95™, the user should click a START button and select the SHUT DOWN item from the START menu. The selection of the SHUT DOWN item causes a dialog box to appear on the screen, giving the user the options of shutting down completely, restarting the PC, or exiting to the disk operating system (DOS).

In these advanced operating systems, the shut down procedure is needed because the numerous pieces of status information and configuration data contained in the Windows Registry file are not updated until the system has been properly shut down. Further, data stored in the disk cache may not be flushed to the disk unless the user properly exits Windows 95™ or Windows NT™. Network connections that are not properly severed can cause additional problems. Thus, the removal of power without following the proper shutdown procedure can corrupt the Windows Registry file and compromise the overall reliability of the computer during subsequent operations. It should be noted, however, that properly exiting these operating systems requires the user to take affirmative action via menu commands prior to toggling the on/off power switch.

Another threat to software integrity is the problem of "malicious code", also referred to as computer viruses. While many computer viruses are relatively benign, computer viruses can be hostile, clandestine and created to target specific types of software or hardware. They can be introduced into a computer in as many ways as the computer can communicate externally, such as through the floppy drive, a network connection or a modem connection. Viruses are typically designed to replicate by secretly attaching copies of themselves to files or boot records so that the user is unaware of the intrusion. It is important to note that once a virus has attached itself to a host program, the program must be different and its integrity has been violated.

Once infected, any subsequent copies of the host file also contain the virus, thereby increasing the potential for destruction. The virus is then activated when the file is executed. Consequently, a virus attached to a data file may remain dormant because the data file is not executable.

One common commercial method of assessing the integrity of user software is to check for viruses by running a virus checking software program. Such programs rely on the characteristics of the known viruses to detect their presence. A new virus may not be detectable by the virus checking software. If a virus is present, the virus checking software itself is susceptible because it is loaded from the infected hard disk and must run in memory that could be infected. In addition, virus checking software can be inconvenient to execute. A thorough check of system resources can take several minutes, and the user is not able to run other applications during this time. Although virus checking software can be configured to execute automatically during system boot up, the user must again take affirmative action to execute or schedule a virus scan at other times.

Another method of assessing a file's integrity prior to executing involves computing an integrity assessment code for the file and verifying that the code matches a predetermined value. Checksums (a type of integrity assessment code) are adequate for detecting accidental modifications of data. However, they are an insecure defense against viruses. A well-designed virus aimed at bypassing normal security features can easily attach itself to a host program without resulting in a different checksum.

To address this problem, advanced modification detection codes (or MDC's) have been developed to specifically detect deliberate corruption of data, and are superior to simple checksums. The intent of MDC's is to make it computationally infeasible to modify data so as to preserve a specific modification detection code value. Modification detection codes are sometimes referred to by other names, including: "cryptographic checksums", "cryptographic hashes", "secure hash algorithms", and "message digests".

In some earlier systems, a secure hash value is calculated and stored for newly installed software. Thereafter, when the computer is turned on again, the stored hash value is compared to a newly calculated value. If a discrepancy is found, the user is alerted. A main disadvantage with this method is that the integrity assessment codes must be stored on the hard disk, thus making the codes themselves susceptible to attack by malicious code. Reverse-engineering a modification detection code, while difficult, is not a mathematically intractable problem. Thus, software-only protective products can offer only limited insurance against the attack of malicious code, due mainly to architectural weakness present in most computer systems. A potential solution is to embed the modification detection code in a permanent read-only memory device, but this can make system reconfiguration quite difficult.

Some degree of protection from data loss is afforded by performing regular backups to a tape drive or similar storage medium. If a file becomes corrupted, an earlier, trusted version can be restored from a backup tape. Any changes made to the file after the backup was performed are lost. Like virus scanning and various other administrative procedures, performing backup operations usually preempts other uses of the computer. To circumvent this potential inconvenience, it is desirable to schedule backups during non-working hours or at times when the user is away from the machine. Scheduling and running the backups also require some sort of affirmative action to be taken by the user or system administrator.

A problem can arise if backups and other operations are scheduled to execute at times when it is unlikely that the computer system will be in use. Most modem computer systems incorporate "energy saving" or "hibernation" features. Techniques that are utilized to conserve energy include powering down disk drives, disabling monitors and reducing processor and system clock frequencies. These features are typically activated when the computer is not used for a predetermined period of time. Depending on its programming and hardware, a computer system may not acknowledge and execute a scheduled operation while the system is in an energy saving mode. Even if a scheduled operation is recognized, current computer architectures cannot ensure secure execution.

SUMMARY OF THE INVENTION

Briefly, the present invention provides a computer system having the capability to automatically and securely execute registered commands or applications immediately prior to the computer powering down or entering a low energy consumption mode.

Following a request to remove power from the computer system or enter a low power consumption mode, a system management interrupt (SMI) is generated. According to the invention, a variety of methods can be used to generate the SMI. In one embodiment, closure or toggling of the power supply on/off switch causes special interrupt circuitry to generate an interrupt service request that instructs the processor to jump to an interrupt service routine which results in a power down SMI being asserted. Alternatively, circuitry coupled to the power supply on/off switch is configured to bypass the interrupt request and generate the power down SMI directly without the need for a standard interrupt. In yet another embodiment, toggling the power supply on/off switch initiates a software process that results in a power down SMI.

A computer system according to the present invention also allows automatic and secure execution of registered applications immediately prior to the computer system entering a low power consumption mode. Examples of such a low power consumption mode include "hibernation mode" and "energy saving mode". In this embodiment, an SMI is again generated in one of a number of ways. Special interrupt circuitry, a keyboard interrupt, activity timers or a software process can all be used to generate the SMI.

Regardless of the manner in which it is generated, the power down or hibernation mode SMI places the computer system in system management mode, causing an SMI handler routine to be executed. In turn, the SMI handler responds by executing all applications registered with the application registrar. Importantly, the registered applications are verified and executed in a secure manner. Before executing a registered application, the SMI handler first generates a current hash value for the program. The term "secure hash value" or "hash value" is used throughout the remainder of this specification to refer generally to a value generated by a modification detection code, the value being specific to a given software application. A "secure hash value" in the preferred embodiment is 160 bits of data (20 bytes) that is essentially a mathematical representation of a file. If any bits in the file are changed, a different hash value will result.

In general, a secure hash table (or other type of integrity assessment code) is provided that contains a secure hash value for each program that the user wants to execute prior to the power down or entry into hibernation mode. The hash table is stored in protected memory that can only be accessed when the computer system is in system management mode. After it has generated a current hash value for the registered application, the SMI handler checks this stored hash table for a secure entry for the application. If a hash value entry is found, it is compared with the newly-calculated hash value for the secured application. In the event the two values match, the integrity of the application is guaranteed and it is loaded into memory and executed. The process is repeated until all applications registered with the application registrar have been executed.

If the two values do not match, the user is alerted to the discrepancy and may be given the option to update or override the stored hash table entry by entering an administrative password. For security sensitive applications, the entire application or a portion of it is loaded into system management mode memory (hereinafter "SMM memory") prior to application.

In an alternate embodiment of the invention, a secured hash value for the table is maintained in SMM memory, while the hash table itself is stored in normal memory. A current table hash value is generated for the hash table before a hash table entry is accessed. The current table hash value is then compared with the table hash value stored in SMM memory. If the values are equal, the integrity of the hash table is verified and the new hash value of the program to be executed can be safely compared with its original value. This embodiment of the invention is useful for overcoming problems associated with the limited size of SMM memory. Both of the aforementioned embodiments of the invention have the additional advantage of being operating system independent.

After all of the registered applications have been executed, the SMI handler transmits a shutdown command to a decoder over a system bus if the SMI was generated as a result of a power down request. Upon detecting that the computer system has issued a shutdown command, the decoder logic causes a SHUTDOWN input to the power supply to be asserted, thereby disabling power to the system. If the SMI was generated as a result of low power consumption mode being activated, the SMI handler transmits appropriate commands to hibernation logic that controls various system components.

The present invention has a wide variety of potential applications, including secure execution of virus detection and removal programs and backing up files prior to shutting down. These and other registered applications are executed securely and without need for intervention by the user.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
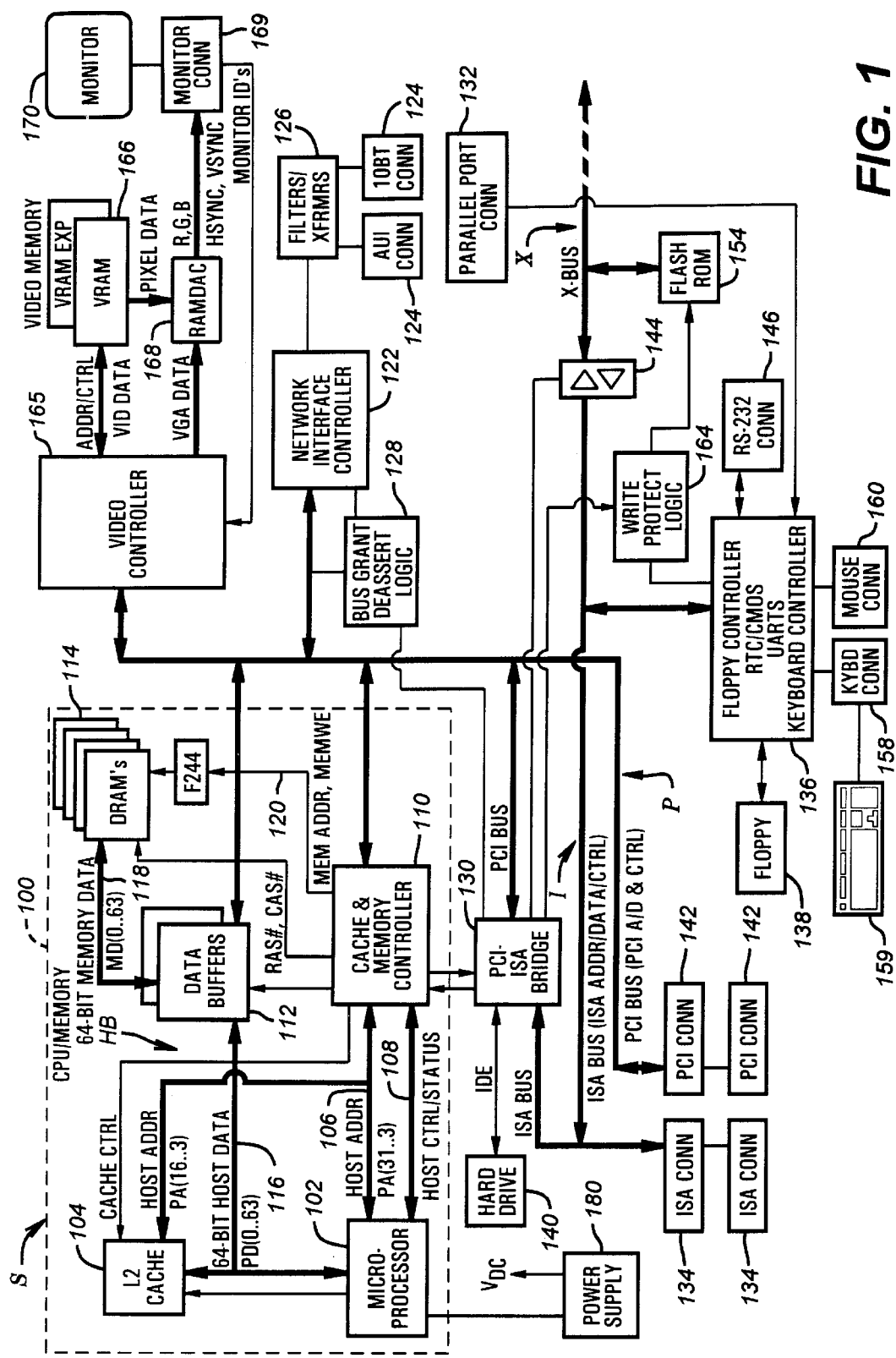
FIG. 1 is a schematic block diagram of a computer system incorporating system management mode capabilities in accordance with the present invention.

Referring first to FIG. 1, a computer system S according to the present invention is shown. In the preferred embodiment, the system S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the computer system S.

A CPU/memory subsystem 100 is connected to the PCI bus P. The processor 102 is preferably the Pentium® processor from Intel Corporation, but could be an 80486 or any number of similar or next-generation processors. The processor 102 drives data, address, and control portions 116, 106, and 108 of a host bus HB. A level 2 (L2) or external cache memory 104 is connected to the host bus HB to provide additional caching capabilities that improve the overall performance of the computer system S. The L2 cache 104 may be permanently installed or may be removable if desired. A cache and memory controller 110 and a PCI-ISA bridge chip 130 are connected to the control and address portions 108 and 106 of the host bus HB. The cache and memory controller chip 110 is configured to control a series of data buffers 112. The data buffers 112 are preferably the 82433LX from Intel, and are coupled to and drive the host data bus 116 and a MD or memory data bus 118 that is connected to a memory array 114. A memory address and memory control signal bus is provided from the cache and memory controller 110.

The data buffers 112, cache and memory controller 110, and PCI-ISA bridge 130 are all connected to the PCI bus P. The PCI-ISA bridge 130 is used to convert signals between the PCI bus P and the ISA bus I. The PCI-ISA bridge 130 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 140 is connected to the IDE interface of the PCI-ISA bridge 130. Tape drives, CD-ROM devices or other peripheral storage devices (not shown) can be similarly connected.

In the disclosed embodiment, the PCI-ISA bridge 130 also includes miscellaneous system logic. This miscellaneous system logic contains counters and activity timers as conventionally present in personal computer systems, an interrupt controller for both the PCI and ISA buses P and I, and power management logic. Additionally, the miscellaneous system logic may include circuitry for a security management system used for password verification and to allow access to protected resources.

The PCI-ISA bridge 130 also includes circuitry to generate a "soft" SMI (System Management Interrupt), as well as SMI and keyboard controller interface circuitry. The miscellaneous system logic is connected to the flash ROM 154 through write protection logic 164. Preferably, the PCI-ISA bridge 130 is a single integrated circuit, but other combinations are possible.

A series of ISA slots 134 are connected to the ISA bus I to receive ISA adapter cards. A series of PCI slots 142 are similarly provided on the PCI bus P to receive PCI adapter cards.

A video controller 165 is also connected to the PCI bus P. Video memory 166 is used to store graphics data and is connected to the video graphics controller 165 and a digital/analog converter (RAMDAC) 168. The video graphics controller 165 controls the operation of the video memory 166, allowing data to be written and retrieved as required. A monitor connector 169 is connected to the RAMDAC 168 for connecting a monitor 170.

A network interface controller (NIC) 122 is also connected to the PCI bus P. Preferably, the controller 122 is a single integrated circuit that includes the capabilities necessary to act as a PCI bus master and slave, as well as circuitry required to act as an Ethernet interface. Attachment Unit Interface (AUI) and 10 base-T connectors 124 are provided in the system S, and are connected to the NIC 122 via filter and transformer circuitry 126. This circuitry forms a network or Ethernet connection for connecting the computer system S to a local area network (LAN).

A combination I/O chip 136 is connected to the ISA bus I. The combination I/O chip 136 preferably includes a real time clock, two UARTS, a floppy disk controller for controlling a floppy disk drive 138, and various address decode logic and security logic to control access to the CMOS memory (not shown) and power-on password values. A control line is provided to the read and write protection logic 164 to further control access to the flash ROM 154. Serial port connectors 146 and parallel port connector 132 are also connected to the combination I/O chip 136.

An 8042 or keyboard controller is also included in the combination I/O chip 136. The keyboard controller is of conventional design and is connected in turn to a keyboard connector 158 and a mouse or pointing device connector 160. A keyboard 159 is connected to the computer system S through the keyboard connector 158.

A buffer 144 is connected to the ISA bus I to provide an additional X-bus X for various additional components of the computer system S. A flash ROM 154 receives its control, address and data signals from the X-bus X. Preferably, the flash ROM 154 contains the BIOS information for the computer system and can be reprogrammed to allow for revisions of the BIOS.

Figure 3:
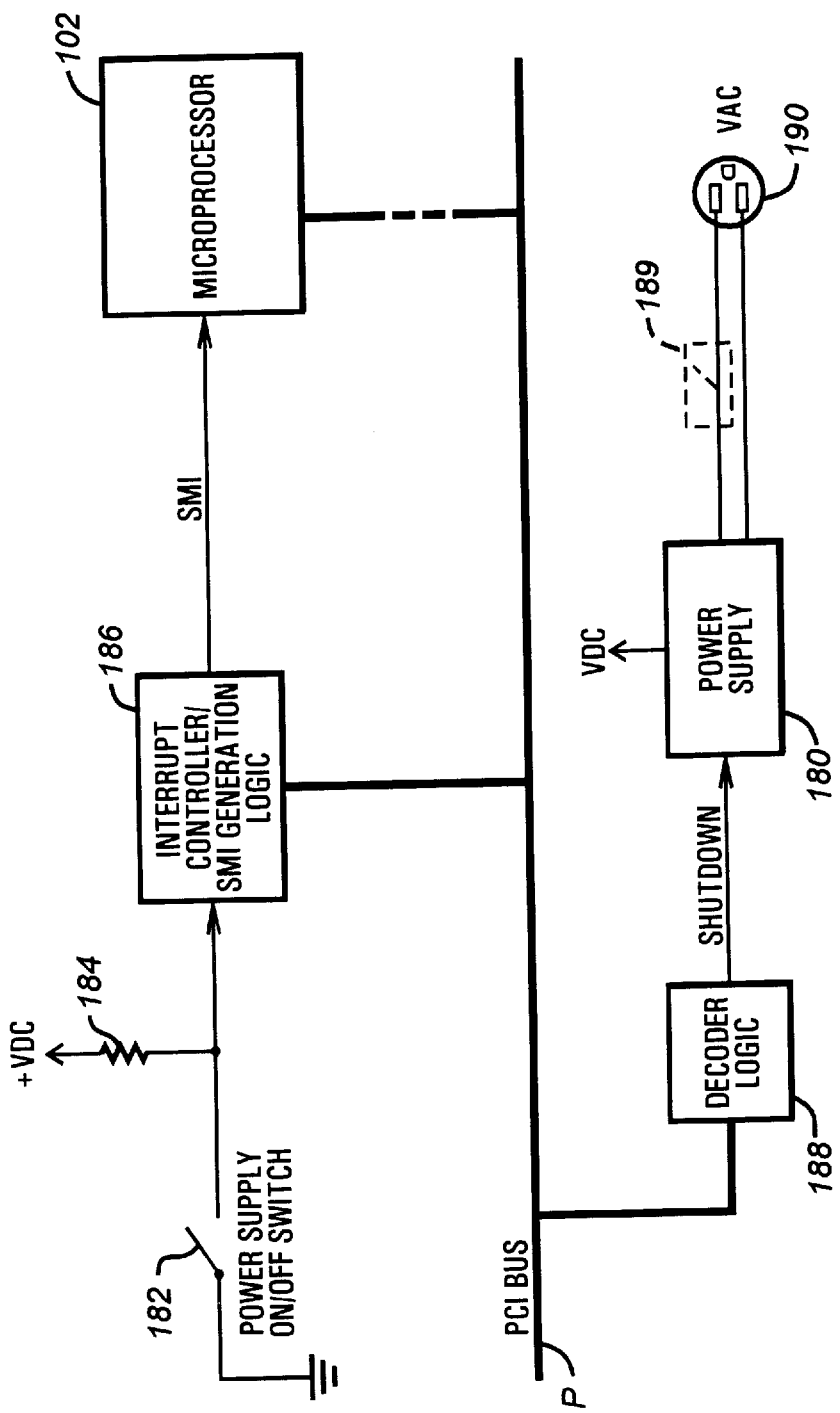
FIG. 3 is a schematic block diagram of a power down circuitry associated with the power supply of the computer system of FIG. 1.

In the computer system S of FIG. 1, all electronic devices discussed above, including the processor 102, are powered by a regulated power supply 180. In the preferred embodiment, the regulated power supply (FIGS. 3 and 4) has a power supply supervisory circuit 192 that provides shutdown capability via a SHUTDOWN input. The power supply 180 is shut-down via an SMI software/hardware process that is initiated by toggling the on/off switch 182 (FIG. 3). The power supply 180 receives an AC voltage supply via an AC plug 190 (FIG. 3).

An additional feature of the computer system S is a System Management Mode (SMM), as discussed at length immediately below. It is also noted that FIG. 1 presents an exemplary embodiment of the computer system S and it is understood that numerous other effective embodiments could readily be developed as known to those skilled in the art.

The System Management Mode

Certain microprocessors, such as the Pentium® processor from Intel Corporation, have included a mode referred to as system management mode (SMM), which is entered upon receipt of a system management interrupt (SMI). Originally, SMIs were power management interrupts devised by Intel Corporation for portable systems. Portable computers often draw power from batteries which provide a limited amount of energy. To maximize battery life, an SMI is typically asserted to turn off or reduce the power to any system component that is not currently in use. Although originally meant for laptop computers, SMIs have become popular for desktop and other stationary models as well.

SMIs are asserted by either an SMI timer, by a system request, or by other means. An SMI is a non-maskable interrupt having almost the highest priority in the system. Only the reset signal R/S* and cache flush signal FLUSH*, which can be conceptualized as interrupts, have a higher priority than the SMI. When an SMI is asserted, a microprocessor maps a portion of memory referred to as the system management mode memory ("SMM memory") into the main memory space. The entire CPU state is then saved in the SMM memory (in the CPU register dump 210 of FIG. 2) in stack-like, last in/first out fashion. After the initial processor state is saved, the processor 102 begins executing an SMI handler routine, which is an interrupt service routine to perform specific system management tasks such as reducing power to specific devices or, as in the case of the present invention, providing security services. While the routine is executed, other interrupt requests are not serviced, and are ignored until the interrupt routine is completed or the microprocessor is reset. When the SMI handler completes its task, the processor state is retrieved from the SMM memory, and the main program continues. An SMI active signal referred to as the SMIACT* signal is provided by the processor to indicate operation in SMM.

As mentioned, following assertion of its SMI input (this is generally an active low signal), the processor 102 calls the SMI handler, which addresses an address space that is separate from ordinary main memory. Thereafter, all memory accesses refer only to SMM memory 200. Input/output ("I/O") accesses via instructions such as IN or OUT are still directed to the normal I/O address space, however. One advantageous side-effect of the hardwired separate address SMM area is that the routines stored in this space cannot be snooped by the cache, providing an additional layer of protection.

In a typical system management mode implementation, it is intended that battery-buffered SRAM chips be mapped into the address space between 30000h and 3fffh by default. External hardware can use the SMIACT* signal as a chip select signal and thereby address either the SRAM chips (the SMIACT* signal is at a logic low level), or the normal main memory (the SMIACT* signal is at a logic high level). By using the SMIACT* signal, then, SMM memory 200 and normal memory can be strictly separated.

The Pentium®, or P5, microprocessor is more flexible than earlier processors in that it permits the SMI handler starting address and the location of the SMM memory space to be changed by the user. Under the Pentium® design, the SMI starting address stored in the microprocessor register is initially set to the conventional 30000h value. Consequently, when the first SMI is asserted, the SMI handler starts at address 38000h (the entry point is offset from the SMM memory base). While the SMI handler routine is executing, however, it may provide a different area of memory to be used as the SMM memory. This new SMM memory may start at any location in the main memory space chosen by the programmer. The SMM memory is a 64-Kbyte block beginning at the new SMM memory start address. When the SMI handler finishes, the new starting address replaces the old starting address in the microprocessor's SMI starting address register.

When the next SMI is asserted, the microprocessor maps the new 64-Kbyte block of memory into the main memory space as the SMM memory, and starts the SMI handler at the new starting address at the midpoint of the new SMM memory. For example, during the first SMI service routine, the programmer may change the SMM memory starting point from 030000h to 100000h. When the SMI is next asserted, the microprocessor maps the SMM memory into main memory space between 100000h and 10FFFFh. The microprocessor then references address 108000h for the SMI handler. This feature thus allows the programmer to choose a more convenient location in the main memory.

Figure 2:
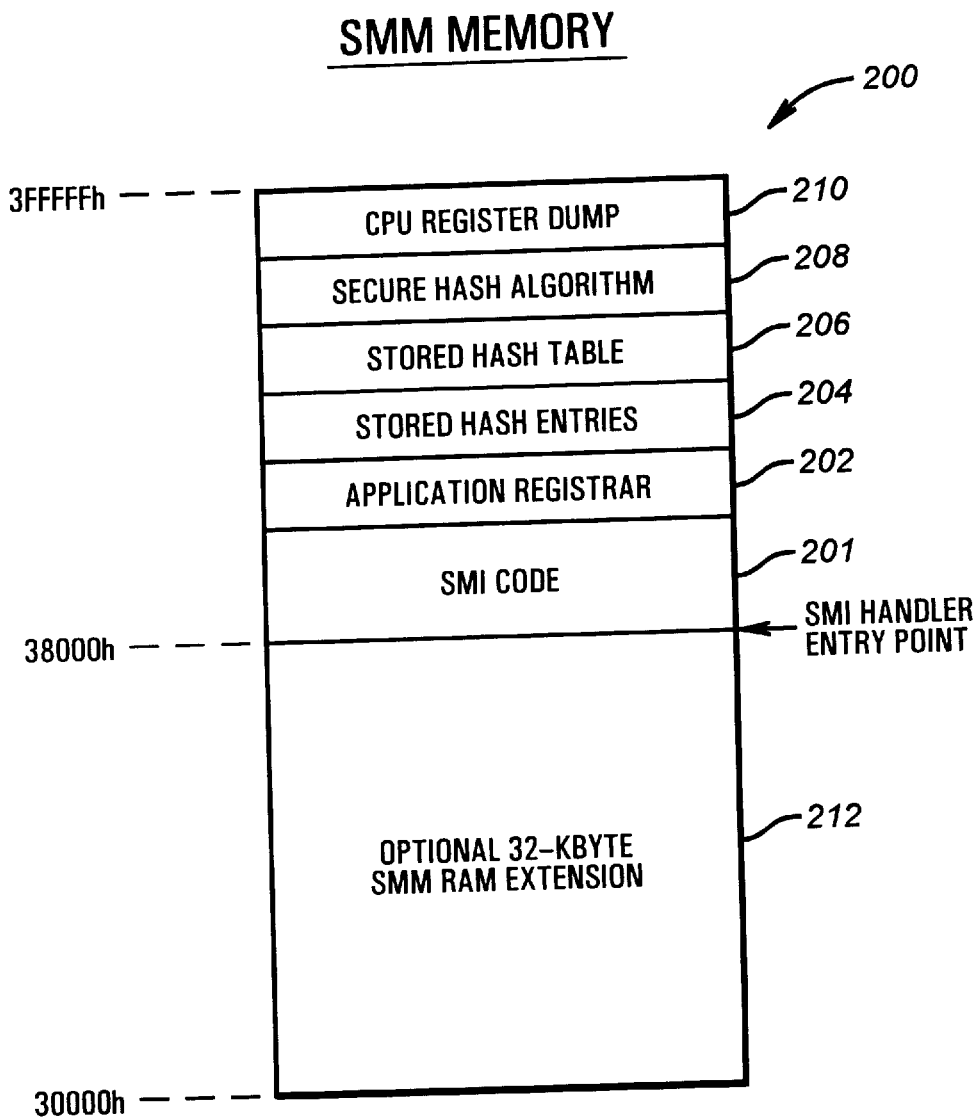
FIG. 2 is a graphical representation of System Management Mode memory according to the present invention.

Referring more specifically to FIG. 2, a graphical representation of SMM memory 200 as configured according to the present invention is shown. As mentioned above, this address space is addressed by the processor 102 following an SMI. Following an SMI, the state of the processor 102 is stored in the CPU register dump 210. The SMI handler 201 is then called and executed by the processor 102. Importantly, the SMI handler 201 can be written such that it performs tasks other than power-down operations. An SMI handler 201 written according to the present invention is able to utilize an application registrar 202, stored hash entries 204, a stored hash table 206, and a secure hash algorithm 208 to securely register and verify the integrity of software applications prior to execution. Because SMM memory 200 is only addressable while the computer system is in SMM, storing the application registrar 202, the hash entries 204, the hash table 206 and the secure hash algorithm 208 in SMM memory 200 prevents malicious code from modifying or reading these sensitive components of the preferred embodiment of the invention.

In an alternate embodiment of the invention, a secured table hash value for the hash table 206 itself is maintained in SMM memory 200, while the hash table 206 is stored in normal, readable memory. In this embodiment, the integrity of the hash table 206 is verified before the hash value of the program to be executed is compared with its original value. This embodiment of the invention, discussed more fully below, is useful for overcoming problems associated with the limited size of SMM memory (64-Kbyte total in the disclosed embodiment). It is also contemplated that the secure hash algorithm 208 could be stored in flash ROM 154. The optional 32-Kbyte SMM RAM extension 212 can be utilized for secure execution of software or to store additional hash values.

As used in this disclosure, the term "secure hash value" or "hash value" refers generally to a value—generated by an integrity assessment code—that is specific to a given software application. Although the disclosed embodiment of the invention utilizes a hash table 206 containing hash values generated by a secure hash algorithm 208, it is contemplated that many types of modification detection codes could be utilized. Of importance to the invention is that each piece of registered software has a corresponding and distinct value that represents the unaltered state of the software, and that this value be stored in a secure memory location. Note also that registered software is referred to generally as "programs" or "applications", and use of these terms is intended to cover software "files".

Turning now to FIG. 3, circuitry is shown for powering down the computer system S and generating an SMI that initiates execution of registered applications. The interrupt controller/SMI generation logic 186 receives an input from a power supply on/off switch 182. One end of the on/off switch 182 is connected to ground, while the other end of the on/off switch 182 is connected to a pull-up resistor 184. The output of the on/off switch is connected to the interrupt controller/SMI generation logic 186. When the power supply on/off switch 182 is closed—indicating that the user desires to power the system down—the input to the interrupt controller/SMI generation logic 186 is pulled low. While the on/off switch 182 is open, pull up resistor 184 pulls the input to a high logic level. The outputs of the interrupt controller/SMI generation logic are placed onto the primary PCI bus P for transmission to the processor 102. In addition, an SMI is communicated between the interrupt controller/SMI generation logic 186 and the processor 102. As mentioned above, the interrupt controller/SMI generation logic 186 is preferably contained within the PCI-ISA bridge 130, although it could be located elsewhere within the system.

Numerous methods are contemplated for generating the SMI. For example, when the on/off switch 182 is closed, the interrupt controller/SMI generation logic 186 can be configured to generate a special interrupt request. As discussed more fully below, the interrupt request instructs the processor 102 to jump to an interrupt service routine which results in a power down SMI being asserted. In turn, the SMI handler 201 responds by executing all applications which are registered with the application registrar 202. After the registered applications have been executed, the SMI handler 201 transmits a shut down command to a decoder 188 over the PCI bus P. Upon detecting that the computer system S has issued a shutdown command, the decoder logic 188 causes the SHUTDOWN input to the power supply 180 to be asserted, thereby disabling power to the system.

Alternatively, the interrupt controller/SMI generation logic 186 can be configured to bypass an interrupt request and generate an SMI directly without the need for a standard interrupt. In this embodiment, information is first written to an appropriate register to communicate a power down request to the SMI handler 201. In yet another embodiment, toggling the power supply on/off switch 182 initiates a software process that results in a power down SMI. Additional hardware and software mechanisms are capable of being modified to generate a power down SMI. These methods include the ability to write to a pre-defined I/O port using the Automatic System Management Interrupt (ASMI) mechanism that results in an SMI. Other methods are also described in programmer's reference manuals (such as the "Intel486™ SL Microprocessor SuperSet Programmer's Reference Manual") for processors that incorporate system management mode capabilities, and are not detailed here for sake of clarity.

In power supplies which do not incorporate a SHUTDOWN input, the output of the decoder logic 188 can be used to cause a switch 189 to break the connection between the alternating current (AC) line input of the power supply 180. In this embodiment, a first end of the AC plug 190 is connected to one end of the switch 189, while a second end of the plug 190 is connected to a second AC input of the power supply 180. A second end of the switch 189 is connected to the first AC input of the power supply 180. The switch 189 can be further connected to the output of the power supply on/off switch 182 so that the connection between the AC plug 190 and the power supply 180 is restored when the user moves the on/off switch 182 to turn on the computer system S from a power down condition. Thus, the switch 189 normally provides and electrical connection for the AC voltage from the plug 190 to the power supply 180.

In this embodiment, the decoder logic 188, upon receipt of a shutdown instruction sent by the processor in response to an SMI from the interrupt controller/SMI generation logic 186, passes the shutdown instruction in the form of an ACTUATION signal (not shown) to the switch 189. The assertion of the ACTUATION signal causes the switch 189, which can be electronic or electromechanical (including power FETs, relays or solid state relays) to be actuated. This in turn breaks or completes the electrical connection between the AC plug 190 and power supply 180. Thus, upon receipt of the shutdown command by the processor 102 after the power supply on/off switch 182 is toggled, the switch 189 disables the power supply 180 so that the system can be powered down following secure execution of registered applications.

Although it is apparent that the processor 102 could periodically poll the power supply on/off switch 182 to sense shutdown requests, the preferred embodiment of the present invention contemplates the use of an interrupt approach. The interrupt approach is more efficient because it allows the processor 102 to execute its main programs and to service peripheral devices such as the on/off switch 182 only when service is requested by the device itself. In the preferred embodiment, therefore, closure of the power supply on/off switch 182 generates an interrupt signal to the interrupt controller/SMI generation logic 186. An interrupt is then generated that is serviced by an interrupt service routine that results in an SMI.

The interrupt controller 186 coupled to the PCI bus functions as an overall manager in accepting interrupt requests from I/O devices. The interrupt controller 186 receives interrupts at selected, assigned inputs from devices located on the expansion bus as well as within the enclosure, including the interrupt signal from the power supply on/off switch 182.

On receipt of the interrupt signal from the power supply on/off switch 182, the interrupt controller 186 pulses an interrupt input to the processor 102. The processor completes the currently executing instruction, issues an interrupt acknowledge signal to the interrupt controller 186, and then executes a service routine to service the requesting device. Normally, after the interrupt has been serviced the processor writes an End-of-Interrupt (EOI) input/output (I/O) command to the interrupt controller and continues processing where it left off. The EOI command is typically sent through an I/O instruction to a register within the interrupt controller 186. The interrupt controller 186 responds to the assertion of an interrupt acknowledge signal from the processor 102 by providing the appropriate interrupt vector to the PCI bus P. In the case of an interrupt caused by closure of the power supply on/off switch 182, the interrupt vector points to the address of an interrupt service routine that results in a shutdown SMI. The interrupt service routine is then executed. Since the processor 102 of the computer system S need not poll the on/off switch 182, detection of the user's request for turning off the computer system S via the on/off switch 182 can be performed using minimal computing resources.

Figure 4:
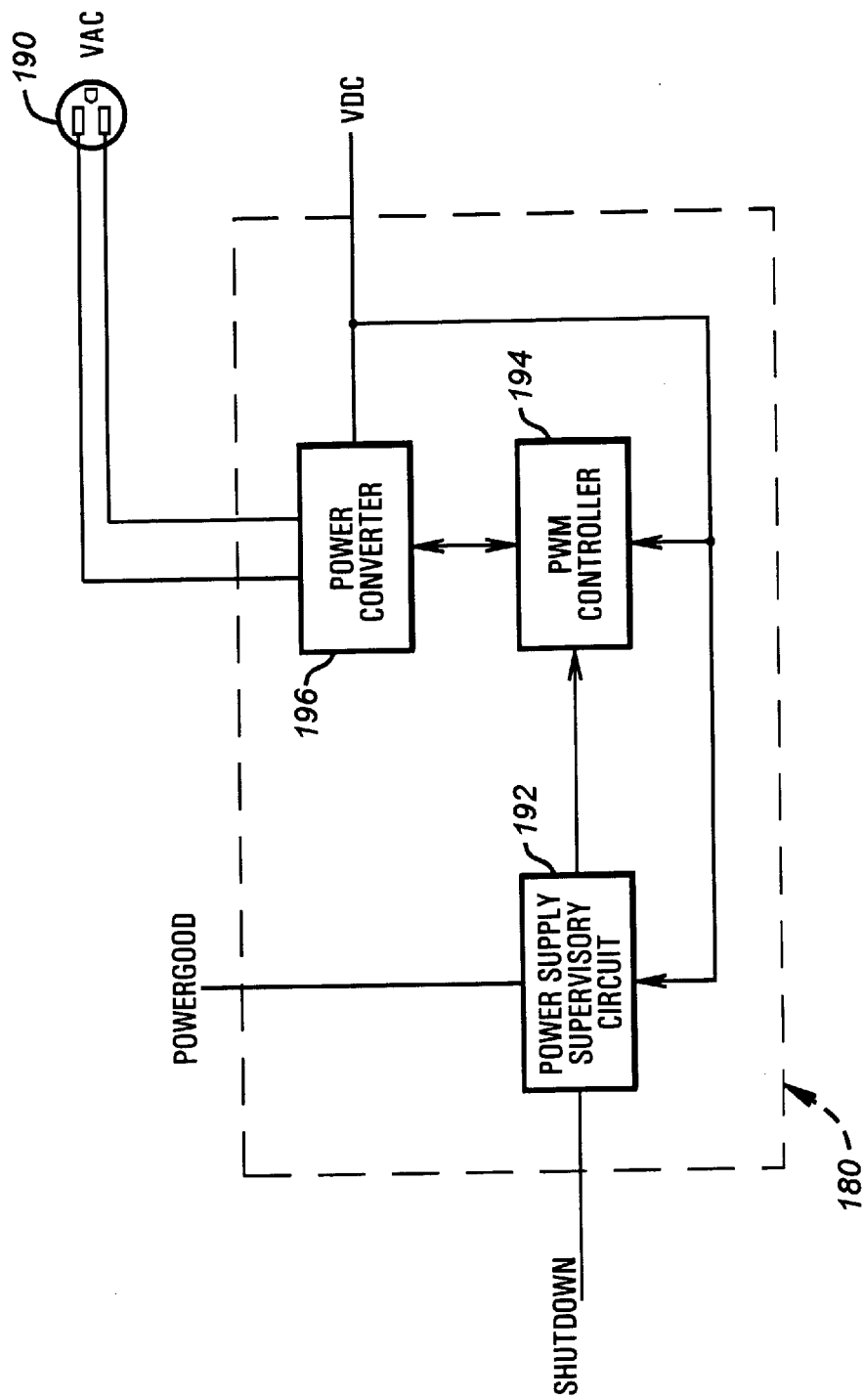
FIG. 4 is a block diagram of the power supply of the computer system of FIG. 1.

The internal circuitry of the regulated power supply 180 is shown in FIG. 4. The circuitry includes a conventional power converter 196 for converting an AC voltage to one or more DC voltages. The power converter 196 preferably has a pair of input power terminals connected to a single-phase AC input power source via the plug 190. As is well-known in the art, the AC terminals are coupled across a bridge rectifier arrangement which develops a high DC voltage across a filter capacitor. This high DC voltage is connected to the input of a power supply controller 194 that includes a pulse width modulator (PWM) for converting the high DC input voltage to a low DC output voltage. The output of the power converter 194 is also connected to a power supply supervisory circuit 192 which generates various output signals indicating the state of the power supply 180, including a POWERGOOD signal. The power supply supervisory circuit 192 also receives the shutdown signal input SHUTDOWN which functions to disable the power supply 180. As has been disclosed, the SHUTDOWN input is asserted following secure execution of the applications registered with the application register 202.

The PWM controller 194 operates as a fixed frequency current mode controller where the duty cycle is set by the input/output voltage ratio. The PWM controller 194 has an enable/disable input signal, driven by a signal from the power supply supervisory circuit 192. The pulse width modulator 194 can thereby be disabled to shutdown the power supply 180 following the secure shutdown procedure.

Figure 5:
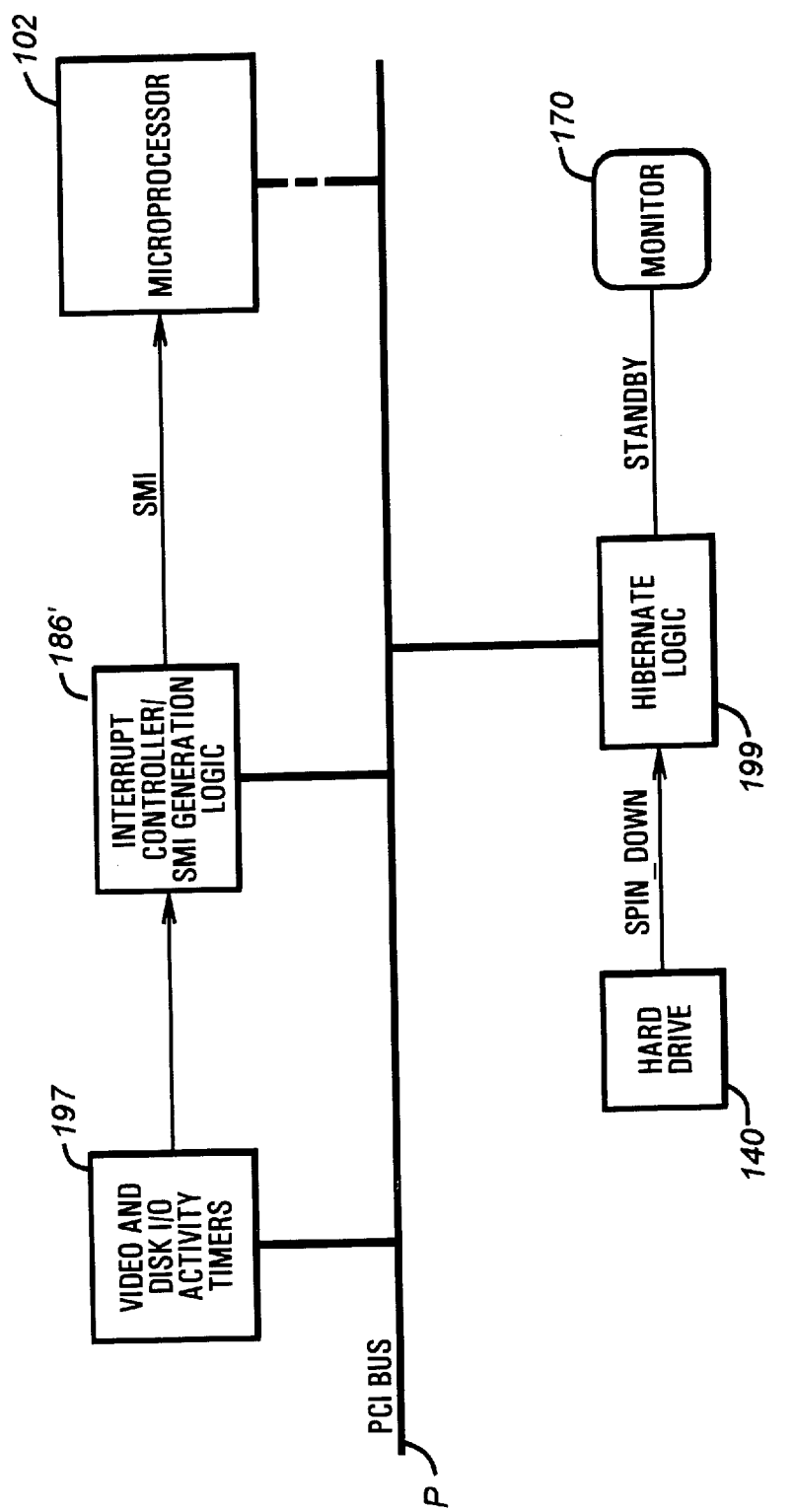
FIG. 5 is a schematic block diagram of hibernation circuitry according to the present invention.

Referring now to FIG. 5, hibernation circuitry for generating an SMI prior to the system entering energy saving mode is shown. According to the invention, it is often desirable to run a series of registered applications prior to entering a hibernation or energy saving mode. Such an energy saving mode is normally entered when the computer system has not been used for a predetermined period of time. The user is presumably not using the computer for other tasks at this point in time. Running registered processes such as file backups, virus scans and disk defragmentation programs prior to the computer system S entering energy saving mode is therefore advantageous. A method for execution of the registered applications is discussed more fully in conjunction with FIG. 6.

Entry into energy saving mode can be predicated on a number of events occurring, including: video or disk drive inactivity, keyboard commands, or SMI countdown timers (which are preferably made visible to other system processes). Various warning timers are provided in processors incorporating system management mode capabilities. These timers can be programmed to allow the system to finish I/O operations such as DMA and disk accesses before the actual SMI is generated.

As shown in FIG. 5, a hard drive 140 and monitor 170 are used as examples of devices whose inactivity can trigger energy saving mode. Video and disk I/O activity timers 197 are used to monitor the PCI bus P for activity occurring on the hard drive 140 and the monitor 170. Following a period of inactivity of predetermined length, the video and disk I/O activity timers 197 communicate a signal to the interrupt controller/SMI generation logic 186'. The interrupt controller/SMI generation logic 186' operates in a similar fashion to the interrupt controller/SMI generation logic 186 of FIG. 3. The interrupt controller 186' responds by asserting an interrupt request which is eventually acknowledged by the processor 102. As mentioned earlier, the interrupt request eventually results in an execution of an interrupt service routine followed by assertion of an SMI to the processor 102. After the SMI handler 201 has completed execution of registered applications, commands are sent over the PCI bus P instructing the hibernation logic 199 to enter energy saving mode. In the case of the hard drive 140, hibernation logic block 199 responds by asserting a signal SPIN_DOWN to the hard drive 140 which results in the hard drive "spinning down" its internal storage platters. For monitor 170, which is preferably ENERGY STAR compliant, a video standby signal STANDBY is received from the hibernation logic 199. Energy saving mode can also result in the processor 102 and other system components being clocked at a lower frequency in order to reduce power consumption.

It is also contemplated that video and disk I/O activity timers 197 could be replaced by a software process that monitors activity to peripheral devices such as the hard drive 140 and monitor 170. The contemplated software monitors the system bus for different types of events (i.e., interrupts for hardware devices, I/O writes, etc.). If one of these events occurs within a specified amount of time, a software timer is reset and no action is taken. If inactivity exceeds a predetermined amount of time, various "levels" of hibernation mode can be entered. For example, the monitor 170 can be powered down followed by power down of the hard drive 140 if a second set of events does not occur within a second predetermined amount of time. This embodiment of the invention results in a considerably reduced gate count. A suitable SMI can be generated at any point in the process, followed by execution of registered applications.

In another embodiment of the invention, the SMI is generated by a software polling process that polls standby signals. The video or disk standby signals can be generated by the aforementioned timers or by other means. In this embodiment, the polling process generates an SMI after it determines that a specified system component (such as the monitor 170 or hard drive 140) has entered standby as indicated by its associated standby signal.

In yet another embodiment of the invention, hibernation mode is entered as a result of a special keyboard interrupt. Here, the interrupt controller/SMI generation logic 186' is programmed to respond to the special keyboard interrupt by asserting an interrupt request that results in generation of an SMI and execution of the registered applications prior to hibernation.

Figure 6:
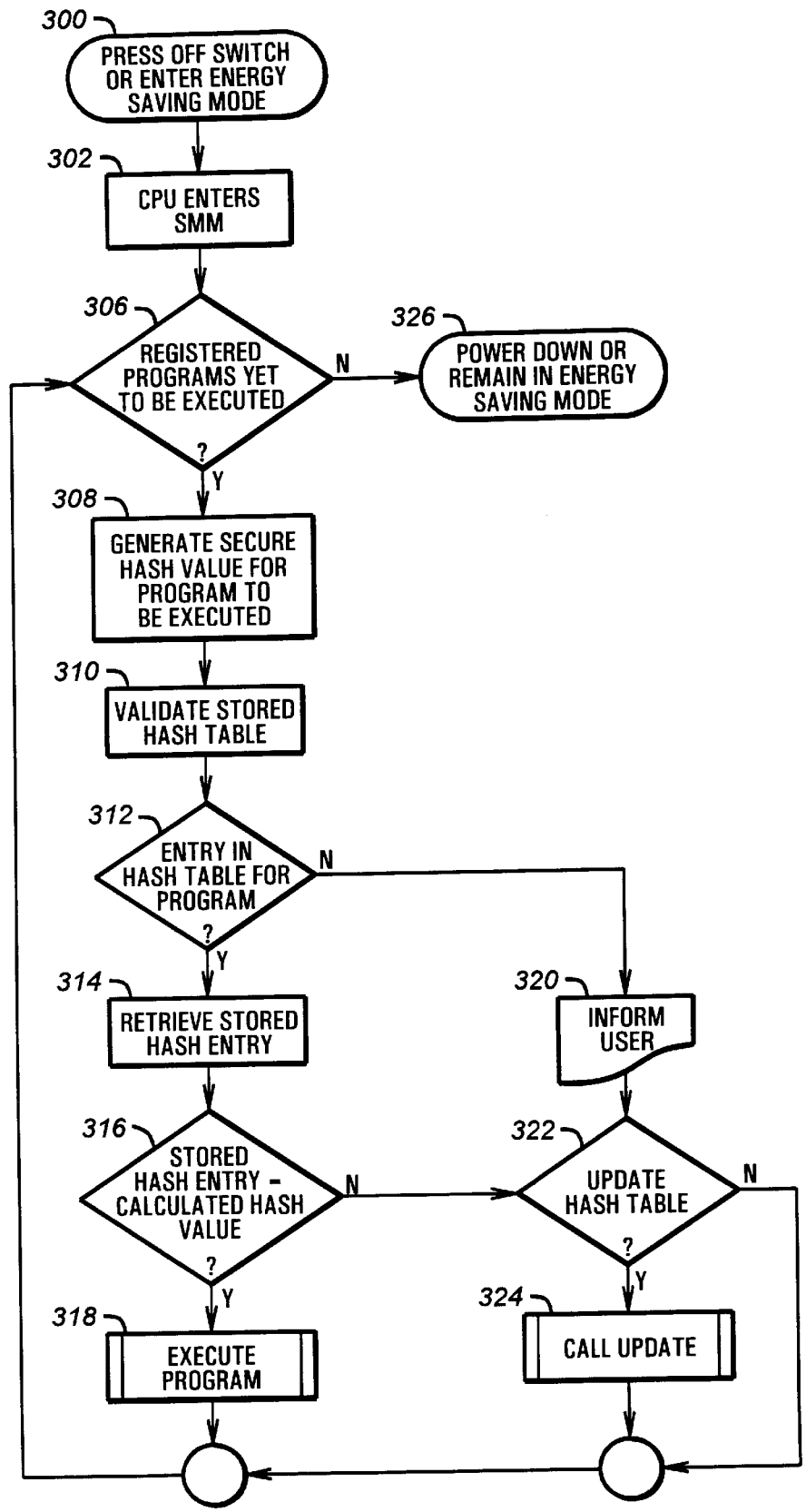
FIG. 6 is a flowchart illustration of a method according to the present invention for securely executing and verifying the integrity of software applications prior to the computer system being turned off or entering hibernation mode.

Referring now to FIG. 6, a flow chart illustration is provided for a method according to the present invention for securely executing registered applications prior to power down or hibernation mode is shown. Control commences in step 300 where either the power supply on/off switch 182 is toggled, or a condition occurs which enables an energy saving mode. Control proceeds to step 302 where an SMI is generated and the processor 102 enters system management mode as a result of the SMI. The circuitry of FIGS. 3 and 5 are demonstrative of methods for generating the SMI, but it is contemplated that the SMI could be generated by a variety of "interrupt generators". In addition, the system management capabilities incorporated in Intel Corp. processors are referred to as "system management mode". Other manufacturers may refer to similar system management capabilities by different names. Of importance to the present invention is a protected address space accessible (preferably in real time) while the processor is in a system management-type mode.

In the preferred embodiment, the SMI that is generated in step 302 causes an SMI handler 201 to be executed. Execution of the SMI handler 201 is operating system independent. Control next proceeds to step 306 where the SMI handler 201 examines the application registrar 202 to determine if registered programs have yet to be executed. Any type of program, including system administration type applications, can be executed. Prior to a power down or energy saving mode, the invention can also be utilized to gracefully shut down the operating system by flushing file buffers to disk and sending a close signal to each open Windows application (applet) and/or other running processes. Data loss due to an accidental or premature removal of power is thereby avoided.

If a program is to be executed as determined in step 306, control passes to step 308 where the SMI handler 201 requests a secure hash value for the program to be executed. This secure hash value is typically generated by the secure hash algorithm 208. Control then passes to step 310 to validate the stored hash table 206 if it is not stored in SMM memory 200. Validation of the stored hash table 206 is accomplished by first generating a current table hash value for the hash table 206 itself. This new table hash value is then compared with a secured table hash value for the hash table 206. If the two values match, the integrity of the hash table 206 is verified. This step allows the hash table 206 to be stored in normal memory, thereby allowing a portion of SMM memory 200 to be used for other purposes, such as secure execution of an application. Note that any authorized modifications to the hash table 206 must be reflected in an updated secure table hash value. If the hash table 206 is stored in SMM memory 200, step 310 is not required because the hash table 206 is presumptively secure.

As part of step 312, the SMI handler 201 next determines if the hash table 206 contains a hash value corresponding to the registered program to be executed. Typically, a secure hash value is created for each program and added to the hash table 206 at the same time the application is added to the application registrar 202. If a hash value for the program is found, control proceeds to step 314 where the stored hash value is retrieved. Control then proceeds to step 314 for a comparison of the newly generated hash value with the stored hash value. If the two values are the same, control passes to step 318 and the program is loaded into memory and executed. As mentioned, the program or portions of it can be loaded into the SMM memory 200 for execution. For example, if a block encryption is being performed, it would not be desirable to have the encryption algorithm exposed in normal memory. Alternatively, the program can be executed from normal memory if secure execution is not needed. In the latter case, system management mode can be exited prior to execution of the program, followed by a return to system management mode after completion of the program. In either case, control returns to step 306 to determine if there are any registered programs that have not been executed.

In step 312, if no hash value corresponding to the program to be executed is found, control proceeds to step 320 and the user is informed that the program is not properly registered to be executed. Control then proceeds to step 322, which is also where control proceeds if the stored hash value does not equal the newly calculated hash value as determined step in 316 (for example, the program has been modified by a virus or a new version of the program has been installed). In step 322, which is an optional enhancement to the present invention, the system is configured to query the user to update the hash table 206 and/or stored hash value to incorporate the program as it currently exists. Alternatively, the user could simply be asked for permission to run the program in its altered state.

If the user desires to update the hash table 206, control passes to step 324 and the subroutine UPDATE 400 (FIG. 4) is called. Following return from UPDATE 400, or if UPDATE 400 is not called following step 322, control again returns to step 306 to determine if there are any register programs yet to be executed. In the event that all of the registered applications have been executed, control then proceeds to step 326 and the system is either powered down or enters an energy saving mode. In the case of system power down, the circuit of FIG. 3 can utilized to disable the power supply. Normally, the circuitry of FIG. 5 enables various energy saving features following execution of the registered applications.

Figure 7:
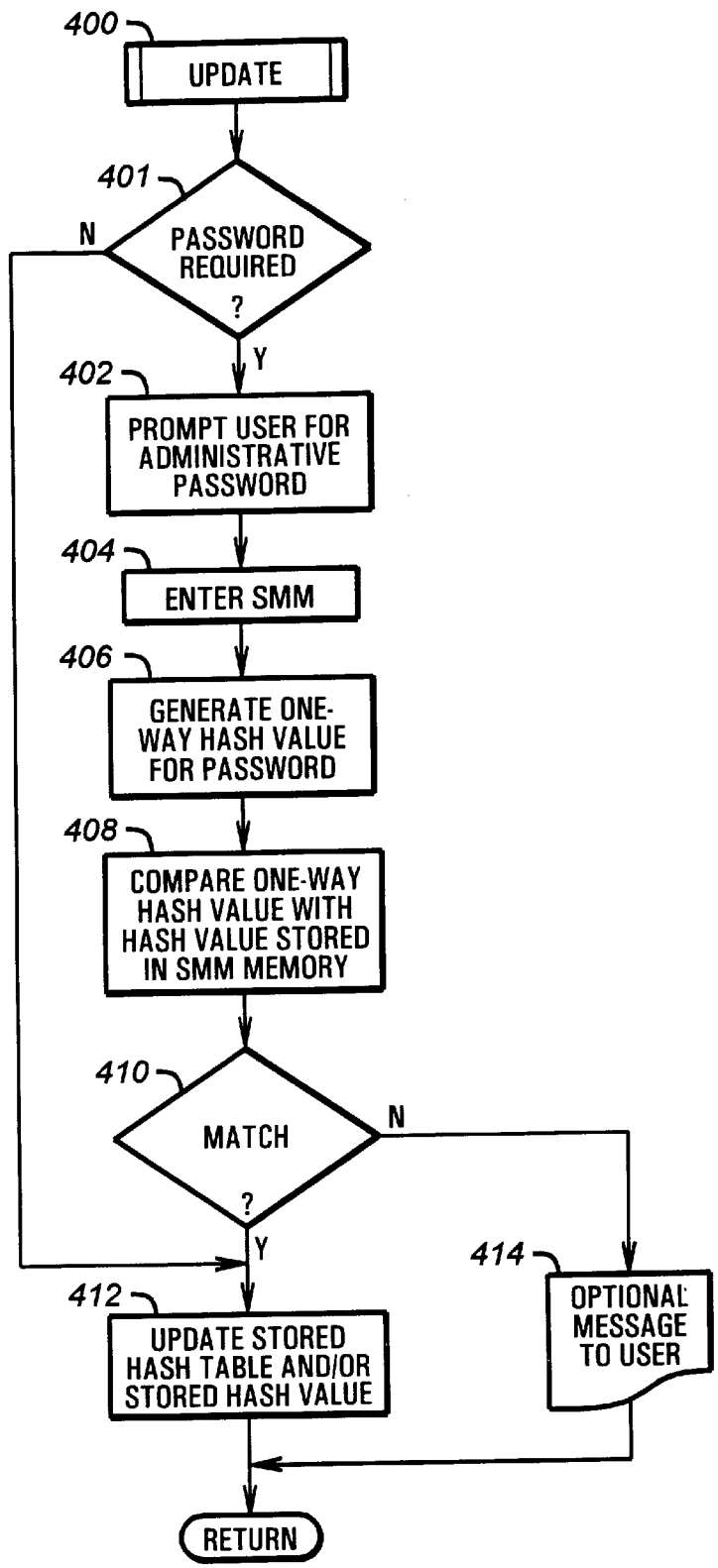
FIG. 7 is a flowchart illustration of a secure method according to the present invention for updating a stored hash table or stored hash value.

Referring now to FIG. 7, a flow chart illustration of a secure method UPDATE 400 for updating a stored hash table or stored hash value is shown. In addition to adding or updating entries for programs that the user wants to execute prior to a shutdown or an energy saving mode, entries can be deleted for programs that are no longer utilized. The subroutine UPDATE 400 is called in step 324 of FIG. 6.

In an initial step 401, the system determines if an administrative password is required to update the stored hash table or stored hash value. If so, the user is prompted for an "administrative" password. The computer system may leave system management mode while the user is entering the administrative password, although entry of the password may not be entirely secure. An SMI is then generated and the computer system enters system management mode in step 404. Control then proceeds to step 406 and a one-way hash value is generated for the entered password. Proceeding to step 408, this hash value is then compared with a hash value stored in SMM memory 200.

If the hash values match as next determined in step 410, control proceeds to step 412 and the hash table and/or stored hash values are updated according to the user's instructions. Control also passes to step 412 if an administrative password is not required as determined in step 401. If the hash values do not match as determined in step 410, control passes to step 414 and the user is informed of the discrepancy. In either case, control next proceeds to step 416 for a return to the main routine of FIG. 6.

When a computer system is operating in a standard mode, it is relatively easy for a programmer to "hook" keyboard interrupts and copy keystroke information as it is being communicated. Thus, the updating subroutine described in FIG. 7 is not entirely secure if the system leaves SMM. An improved method for establishing a secure keyboard link to enter password and other information is disclosed in U.S. patent application Ser. No. 08/657,982 entitled "METHOD AND APPARATUS FOR PROVIDING SECURE AND PRIVATE KEYBOARD COMMUNICATIONS IN COMPUTER SYSTEMS", filed May 29, 1996 and hereby incorporated by reference. As described therein, to keep a password or other sensitive information from being visible to malicious code it can be communicated via a secure keyboard link to a "black box" security device integrated within a system component such as the PCI-ISA bridge 130. The password data as well as user-entered keystrokes are not stored in normal readable memory, preventing them from being surreptitiously obtained. The secured keyboard link is initiated by the SMI handler and each keystroke is sent to the black box while the system is in SMM. The keystrokes are not visible to any other processes, and the black box can only be written in this manner. It is contemplated that this method can be used to enter an administrative password required to update the secured hash table.

Thus, it can be seen that a computer system according to the present invention provides for automatically and securely executing registered programs immediately prior to the computer system powering down or entering an energy saving mode. An SMI is generated that causes an SMI handler routine to generate current hash values for registered programs. The new hash values are securely compared with stored hash values prior to execution of the programs. After all registered programs have been executed, the system automatically powers down or enters a reduced energy consumption mode. The present invention thereby allows secure and convenient execution of programs or commands that would typically interfere with normal computer use.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for secure execution of software prior to a computer system entering a reduced energy consumption state, the computer system having a processor incorporating system management capabilities, the computer system also having an application registrar maintained in protected system management memory and a stored table containing a modification detection value for programs contained in the application registrar, the computer system further including a power supply source, the method comprising the steps of:

registering a program with the application registrar;

generating a system management interrupt in response to a request to place the computer system in a reduced energy consumption state;

placing the computer system in system management mode as a result of said step of generating a system management mode interrupt; and executing a system management interrupt handler upon entry into system management mode, wherein said execution of the system management interrupt handler comprises the steps of:

generating a current modification detection value for the program registered with the application register;

determining if the stored table contains a secure modification detection value for the registered program or file;

retrieving the secure modification detection value if it exists in the stored table;

comparing the current modification detection value to the secure modification detection value if it exists in the stored table; and permitting execution of the registered program if the secure modification detection value exists in the stored table and the current modification detection value matches the secure modification detection value.

2. The method of claim 1, wherein the reduced energy consumption state involves disabling the power supply to computer system components.

3. The method of claim 2, further comprising the step of:

following execution of the registered program, transmitting a shutdown control signal to the power supply source or otherwise causing power to be removed from computer system components without further intervention from the computer user.

4. The method of claim 1, wherein the reduced energy consumption state is a low energy consumption mode in which energy saving features of the computer system are enabled.

5. The method of claim 4, further comprising the step of:

following execution of the registered program, asserting an activation signal to the energy saving features of the computer system or otherwise causing the computer system to enter a low energy consumption mode without further intervention from the computer user.

6. The method of claim 1, wherein the secure modification detection value and the current modification detection value are hash values generated by a hash algorithm.

7. The method of claim 1, further comprising the steps of:

following said step of determining if the stored table contains a secure modification value for the registered program, alerting the user if the stored table does not contain a secure modification detection value for the registered program;

determining if the user desires to update the stored table to include a secure modification detection value for the registered program;

determining if an administrative password is required to update the stored table;

requesting an administrative password that allows access to the stored table if the user desires to update the stored table and an administrative password is required; and updating the stored table to include a secure modification detection value for the registered program if the user desires to update the stored table and no administrative password is required or following entry of the administrative password if an administrative password is required.

8. The method of claim 7, further comprising the steps of:

following said step of comparing the current modification detection value to the secure modification detection value, alerting the user if the current modification detection value is not equal to the secure modification detection value;

determining if the user desires to update the stored table to include the current modification detection value;

determining if an administrative password is required to update the stored table;

requesting an administrative password that allows access to the stored table if the user desires to update the stored table and an administrative password is required; and updating the stored table to include the current modification detection value if the user desires to update the stored table and no administrative password is required or following entry of the administrative password if an administrative password is required.

9. The method of claim 1, wherein the stored table is maintained in normal memory and a secure table modification detection value for the table itself is maintained in protected system management memory, the method further comprising the steps of:

prior to said step of permitting execution of the registered program, generating a current table modification detection value for the stored table;

comparing the current table modification detection value to the secure table modification detection value; and retrieving the secure modification detection value if it exists in the stored table and the current table modification detection value is equal to the secure table modification detection value.

10. The method of claim 9, further comprising the steps of:

following said step of determining if the stored table contains a secure modification value for the registered program, alerting the user if the stored table does not contain a secure modification detection value for the registered program;

determining if the user desires to update the stored table to include a secure modification detection value for the registered program;

determining if an administrative password is required to update the stored table;

requesting an administrative password that allows access to the stored table if the user desires to update the stored table and an administrative password is required;

updating the stored table to include a secure modification detection value for the registered program if the user desires to update the stored table and no administrative password is required or following entry of the administrative password if an administrative password is required; and updating the secure table modification detection value to correspond to the updated stored table.

11. The method of claim 10, further comprising the steps of:

following said step of comparing the current modification detection value to the secure modification detection value, alerting the user if the current modification detection value is not equal to the secure modification detection value;

determining if the user desires to update the stored table to include the current modification detection value;

determining if an administrative password is required to update the stored table;

requesting an administrative password that allows access to the stored table if the user desires to update the stored table and an administrative password is required;

updating the stored table to include the current modification detection value if the user desires to update the stored table and no administrative password is required or following entry of the administrative password and an administrative password is required; and updating the secure table modification detection value to correspond to the updated stored table.

12. The method of claim 9, wherein the secure table modification detection value, the current table modification detection value, the secure modification detection value and the current modification detection value are hash values generated by a hash algorithm.

13. A computer system comprising:

a processor incorporating system management capabilities;

a power supply source for supplying power to the computer system;

a protected system management memory, the system management memory containing:

a modification detection code for generating a modification detection value;

an application registrar containing a value that specifies a registered program;

a secure modification detection value for the registered program, wherein the secure modification detection value represents an authorized or unaltered condition for the program; and a system management mode interrupt handler routine for directing the processor to:

generate, via said modification detection code, a current modification detection value for the program registered with said application registrar;

determine if the current modification detection value is equal to the secure modification detection value;

permit execution of the registered program if the current modification detection value is equal to the secure modification detection value; and transmit a shutdown control signal to the power supply source or otherwise cause power to be removed from the computer system without further intervention from the computer user; and an interrupt generator configured to generate a system management interrupt in response to a request to remove power to the computer system, wherein the system management mode interrupt causes the system management interrupt handler routine to be executed.

14. The computer system of claim 13, wherein the modification detection code is a hash algorithm and the modification detection values are hash values.

15. A computer system comprising:

a processor incorporating system management capabilities;

a protected system management memory, the protected system management memory containing:

a modification detection code for generating a modification detection value;

an application registrar containing a value that specifies a registered program, a secure modification detection value for the registered program, wherein the secure modification detection value represents an authorized or unaltered condition for the program; and a system management mode interrupt handler routine for directing the processor to:

generate, via said modification detection code, a current modification detection value for the program registered with said application registrar;

determine if the current modification detection value is equal to the secure modification detection value;

permit execution of the registered program if the current modification detection value is equal to the secure modification detection value; and assert an activation signal to energy saving features of the computer system or otherwise cause the computer system to enter a low energy consumption mode without further intervention from the computer user; and an interrupt generator for generating a system management interrupt in response to a period of inactivity of predetermined length in a specified system component, wherein the system management mode interrupt causes the system management interrupt handler routine to be executed.

16. The computer system of claim 15, wherein the modification detection code is a hash algorithm and the modification detection values are hash values.

17. The computer system of claim 15, further comprising:

interrupt logic coupled to said interrupt generator, wherein said interrupt generator is an activity timer that causes said interrupt logic to generate the system management interrupt.

18. The computer system of claim 15, wherein said interrupt generator is a software process that monitors the system for activity to or from the specified system component.

19. A method for execution of registered software prior to a computer system entering a reduced energy consumption state, the computer system having a processor incorporating system management capabilities and a power supply source, the method comprising the steps of:

registering a program with an application registrar maintained in protected system management memory;

generating a system management interrupt in response to a request to place the computer system in a reduced energy consumption state;

placing the computer system in system management mode as a result of said step of generating a system management mode interrupt; and executing a system management interrupt handler upon entry into system management mode, wherein said execution of the system management interrupt handler comprises the steps of:

determining that the application registrar contains a registration for the program to be executed; and permitting execution of the program that is determined to be registered.

20. The method of claim 19, wherein the reduced energy consumption state involves disabling the power supply to computer system components.

21. The method of claim 20, further comprising the step of:

following execution of the registered program, transmitting a shutdown control signal to the power supply source or otherwise causing power to be removed from computer system components without further intervention from the computer user.

22. The method of claim 19, wherein the reduced energy consumption state is a low energy consumption mode in which energy saving features of the computer system are enabled.

23. The method of claim 22, further comprising the step of:

following execution of the registered program, asserting an activation signal to the energy saving features of the computer system or otherwise causing the computer system to enter a low energy consumption mode without further intervention from the computer user.

* * * * *